(12) United States Patent
Garakani et al.

(10) Patent No.: US 7,369,559 B2
(45) Date of Patent: May 6, 2008

(54) ADAPTIVE CALL ADMISSION CONTROL FOR CALLS HANDLED OVER A COMPRESSED CLEAR CHANNEL

(75) Inventors: Mehryar Khalili Garakani, Westlake Village, CA (US); Prasad Miriyala, Union City, CA (US); Anantha R. Mekala, Leominster, MA (US); Jianping Huang, San Jose, CA (US)

(73) Assignee: Cisco Technology Inc., San Jose, CA (US)

( * ) Notice: Subject to any disclaimer, the term of this patent is extended or adjusted under 35 U.S.C. 154(b) by 850 days.

(21) Appl. No.: 10/680,601

(22) Filed: Oct. 6, 2003

(65) Prior Publication Data
US 2005/0074012 A1 Apr. 7, 2005

(51) Int. Cl.
*H04L 12/28* (2006.01)
*H04L 12/56* (2006.01)
*H04L 12/26* (2006.01)
*H04J 3/18* (2006.01)
*G06F 15/16* (2006.01)

(52) U.S. Cl. .................. 370/395.2; 370/252; 370/468; 370/477; 370/521; 709/205; 709/247

(58) Field of Classification Search ............... None
See application file for complete search history.

(56) References Cited

U.S. PATENT DOCUMENTS

| | | | |
|---|---|---|---|
| 5,453,986 A * | 9/1995 | Davis et al. ............... 370/259 |
| 5,513,183 A * | 4/1996 | Kay et al. .................. 370/337 |
| 5,761,619 A * | 6/1998 | Danne et al. ............ 455/422.1 |
| 6,459,681 B1 | 10/2002 | Oliva |
| 6,728,270 B1 | 4/2004 | Meggers et al. |
| 6,771,648 B1 * | 8/2004 | Kim et al. ............... 370/395.2 |
| 6,778,496 B1 | 8/2004 | Meempat et al. |
| 6,798,786 B1 | 9/2004 | Lo et al. |
| 6,823,392 B2 | 11/2004 | Cherkasova et al. |
| 6,842,463 B1 | 1/2005 | Drwiega et al. |
| 6,842,618 B2 | 1/2005 | Zhang |
| 6,856,948 B1 | 2/2005 | Tran |
| 6,868,080 B1 | 3/2005 | Umansky et al. |
| 6,868,273 B2 | 3/2005 | Cave |
| 7,010,329 B2 * | 3/2006 | Livet et al. ............... 455/574 |

(Continued)

FOREIGN PATENT DOCUMENTS

EP 1 322 132 A 7/2003

OTHER PUBLICATIONS

Bobby Vandalore et al.; *AQuaFWiN; Adaptive QoS Framework for Multimedia in Wireless Networks and its Comparison with other QoS Frameworks* IEEE Conference on Lowell; Oct. 1999 pp. 88-92.

(Continued)

*Primary Examiner*—Ronald Abelson
(74) *Attorney, Agent, or Firm*—Stolowitz Ford Cowger LLP

(57) ABSTRACT

A system that packetizes telephone calls using loss-less codecs for transmission over a communication link. The system includes a call admission control mechanism that admits calls for transmission over the communication link. An adaptive system which monitors bandwidth usage and which dynamically provides a feedback loop to the CAC system. The bandwidth allocation for transmission of the calls and the admission of calls is based upon actual bandwidth usage conditions in the system.

15 Claims, 4 Drawing Sheets

U.S. PATENT DOCUMENTS

| | | |
|---|---|---|
| 7,103,068 B1 * | 9/2006 | Gardner et al. ............. 370/468 |
| 7,200,384 B1 * | 4/2007 | Tervo et al. ............. 455/414.1 |
| 2002/0126699 A1 * | 9/2002 | Cloonan et al. ............ 370/468 |
| 2003/0123388 A1 | 7/2003 | Bradd |
| 2003/0129988 A1 | 7/2003 | Lee et al. |

OTHER PUBLICATIONS

J. Wang et al.; *Shape VQ-based Adaptive Predictive Lossless Image Coder*, IEEE Region 10 Annual Conference; Dec. 1997 pp. 561-564.

* cited by examiner

Policing

ADAPTIVE CALL ADMISSION CONTROL FOR CALLS HANDLED OVER A COMPRESSED CLEAR CHANNEL

FIELD OF THE INVENTION

This invention relates to electronic communications networks and more particularly to packet networks.

BACKGROUND OF THE INVENTION

Abbreviations used herein:
CBR Constant Bit Rate
VBR Variable Bit Rate
TDM Time Division Multiplex
LLC loss-less compression codec
VBR variable bit rate
RT Real Time
CAC Call Admission Control
BS Base Station
BTS Base Transceiver Station
BSC Base Station Controller
GSM Global System for Mobile communications
VAS Voice Activity Status Traditional telephone networks transmit multiple telephone calls over a single channel using time division multiplex (TDM) technology. When TDM is used to transmit telephone calls, the communication channels transmits the data at a constant bit rate (CBR).

Telephone calls can also be transmitted over packet networks. Loss-less compression codecs (LLC) can be used to packetize telephone calls for transmission over a packet network While traditional TDM transmits data at a CBR, LLCs produce a variable bit rate (VBR) data stream.

Typically when multiple streams of VBR traffic are transmitted over a particular link, the amount of bandwidth allocated for each channel is based on the expected average bit rate of the various channels. In many situations the bit rate of the VBR sources are not correlated and hence averages and expectations are a reasonable approach to allocating bandwidth for such links. In many situations, the bandwidth allocated to a VBR connection is established at call set up time. The bandwidth allocation remains constant for all VBR calls which have the same characteristics.

The VBR data streams produced by LLCs operating on voice calls have some special characteristics. Such channels in effect emulate Constant Bit Rate (CBR) channels. Furthermore, they must have a very low error bit rate since they are a replacement for TDM links which have a very low bit error rate. In a typical VBR link, if bandwidth usage exceeds that which can be accommodated over a particular link, a policing mechanism kicks in, and in general this causes higher error rates. The VBR data streams produced by LLCs operating on voice calls generally can not tolerate high error rates.

The present invention also addresses the problem that occurs when a VBR communication link is oversubscribed. That is, the present invention addresses the problem that occurs when there is not enough bandwidth to handle all of the calls destined for a particular link.

In many communication links, a Call Admission Control (CAC) system is used to allocate calls to various links. Typically CAC systems allocate bandwidth for each call when the call is set up. Bandwidth is allocated based on a formula that takes into account the nature of the call in a conventional system, the bandwidth allocation formula does not take into account the amount of bandwidth actually being used by other calls that are being handled by the system at that particular time.

SUMMARY OF THE PRESENT INVENTION

The present invention provides an adaptive system which monitors bandwidth usage and which dynamically provides a feedback loop to the CAC system. Thus with the present invention bandwidth allocation and call admission is based upon actual conditions in the system. The present invention monitors actual bandwidth usage, and if the amount of bandwidth required by a new call exceeds the bandwidth actually available, the new call is not admitted into the system.

The present invention also provides a policing mechanism that insures that if over subscription occurs, the most important data channels are not significantly affected. That is, with the present invention, if over-subscription occurs, low priority channels are suppressed and hence, only the low priority channels are affected. If there are no low priority channels, a small number of channels is suppressed so that only the selected small number of channels are affected by the over-subscription.

DETAILED DESCRIPTION

Cellular phone networks typically include multiple Base Transceiver Stations(BTS) and at least one Base Station Controller (SC). The BTS maintain communications with mobile radio-telephone sets within a given range. The BTS includes (or is connected to) antennas and radio equipment necessary to provide wireless service in a particular area. Base Transceiver Stations are sometimes referred to as Base Stations (BS).

A Base Station Controller (BSC) performs radio signal management functions for one or more base stations. The BSC provides functions such as frequency assignment and handoff.

Cellular systems in Europe generally operate using the "Global System for Mobile Communication" (GSM) system. GSM is a globally accepted standard for digital cellular communication systems that operate at 900 MHz.

Figure 1:
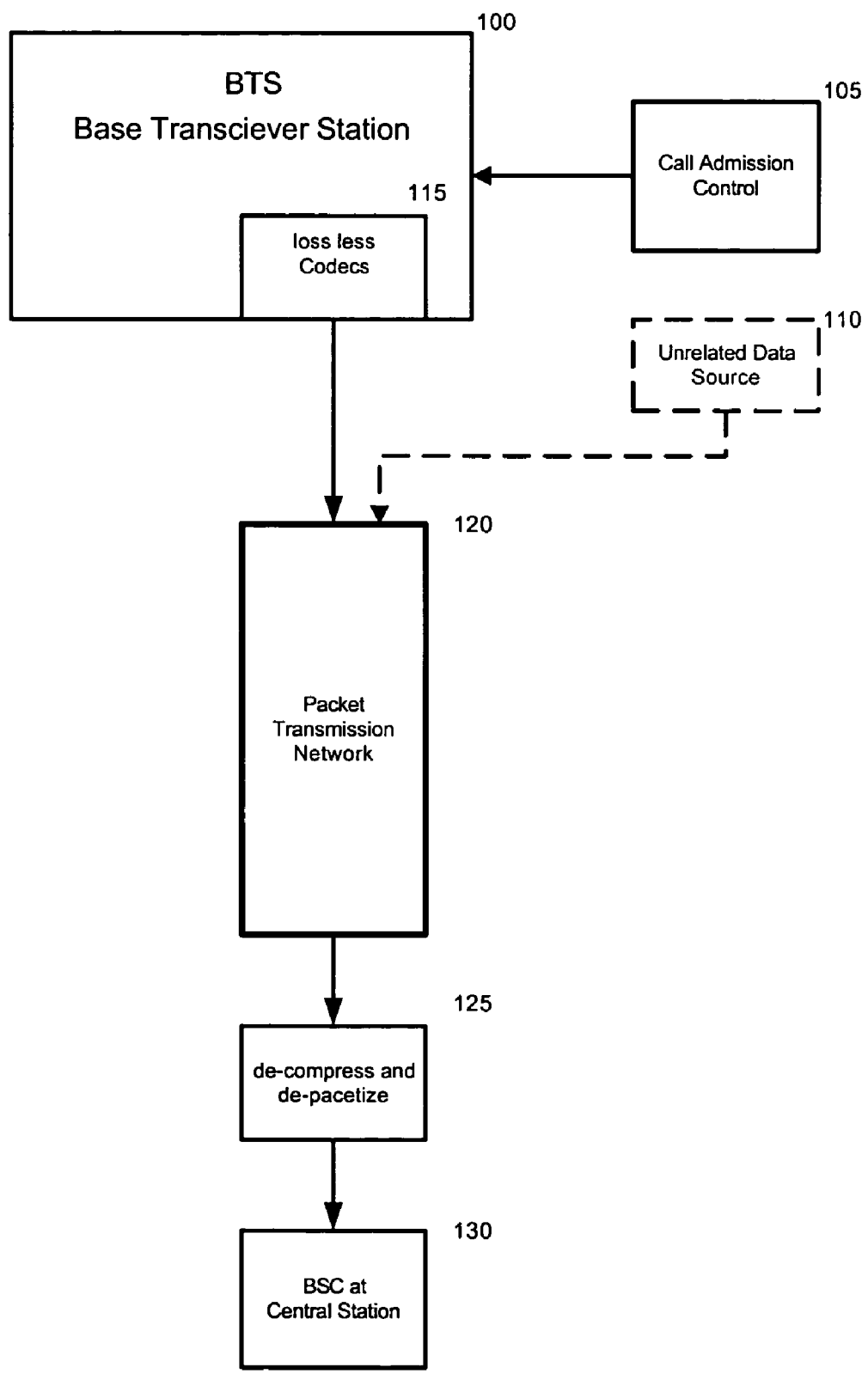
FIG. 1 is an overall system diagram of a preferred embodiment.

In the preferred embodiment shown and described herein, the invention is applied to link between a BTS and a BSC in a GSM system. FIG. 1 is an overall diagram of the preferred embodiment. As shown in FIG. 1, a packet communication channel 120 connects a GSM BTS 100 to a BSC 130. The BTS has an associated Call Admission Control (CAC) System 105. The CAC 105 may be located at the BTS or it may be remote and it may be part of a larger CAC that handles several BTS locations. Channel 120 also carries control data associated with call set up. In some alternate embodiments, channel 120 may also carry other unrelated data from a unrelated data source 110. Channel 120 may be a conventional internet communication link. Data from the BTS 100 is packetized by loss-less codecs 115 prior to transmission through channel 120. The data is de-compressed and de-packetized by unit 125 at the output of the transmission channel 120. The call admission control 105 is a standard device; however, with the present system it is provided with additional feedback data that helps it determine the number of calls that can be admitted to the transmission link 120 at any particular time.

The communication channel 120 has a limited bandwidth. For example it may be a conventional T1 line which has a number of DS0s carrying GSM cellular calls. In a typical GSM system, each DS0 carries four GSM sub-channels. That is, four calls can be handled by one DS0. One LLC handles the data for one DS0. The system will include as many LLCs as there are DS0s being utilized.

With prior art techniques, a particular amount of bandwidth is allocated for each DS0 at call set up time. In practice, the actual amount of bandwidth used by each DS0 varies over time for two primary reasons. First, the amount of bandwidth used depends upon the number of calls being transmitted on the particular DS0. Since each DS0, that is, each loss-less codec, can accommodate from zero to four calls. The bandwidth actually used by any particular DS0 depends on the number of calls being handled by the particular DS0 and the particular loss-less codec. Second, for each particular call there is a difference between the bandwidth used during "spurts of talk" and periods of silence.

Using some prior art techniques, the assignment of bandwidth is based on the assumption that the bandwidth required by the various channels is not coordinated. That is, one can get an average bandwidth assuming that when one channel is over the "average" there are another channels that would be under average. In a telephone transmission link, the use of channels is often found to be coordinated and thus, use of averages has certain disadvantages.

Figure 2:
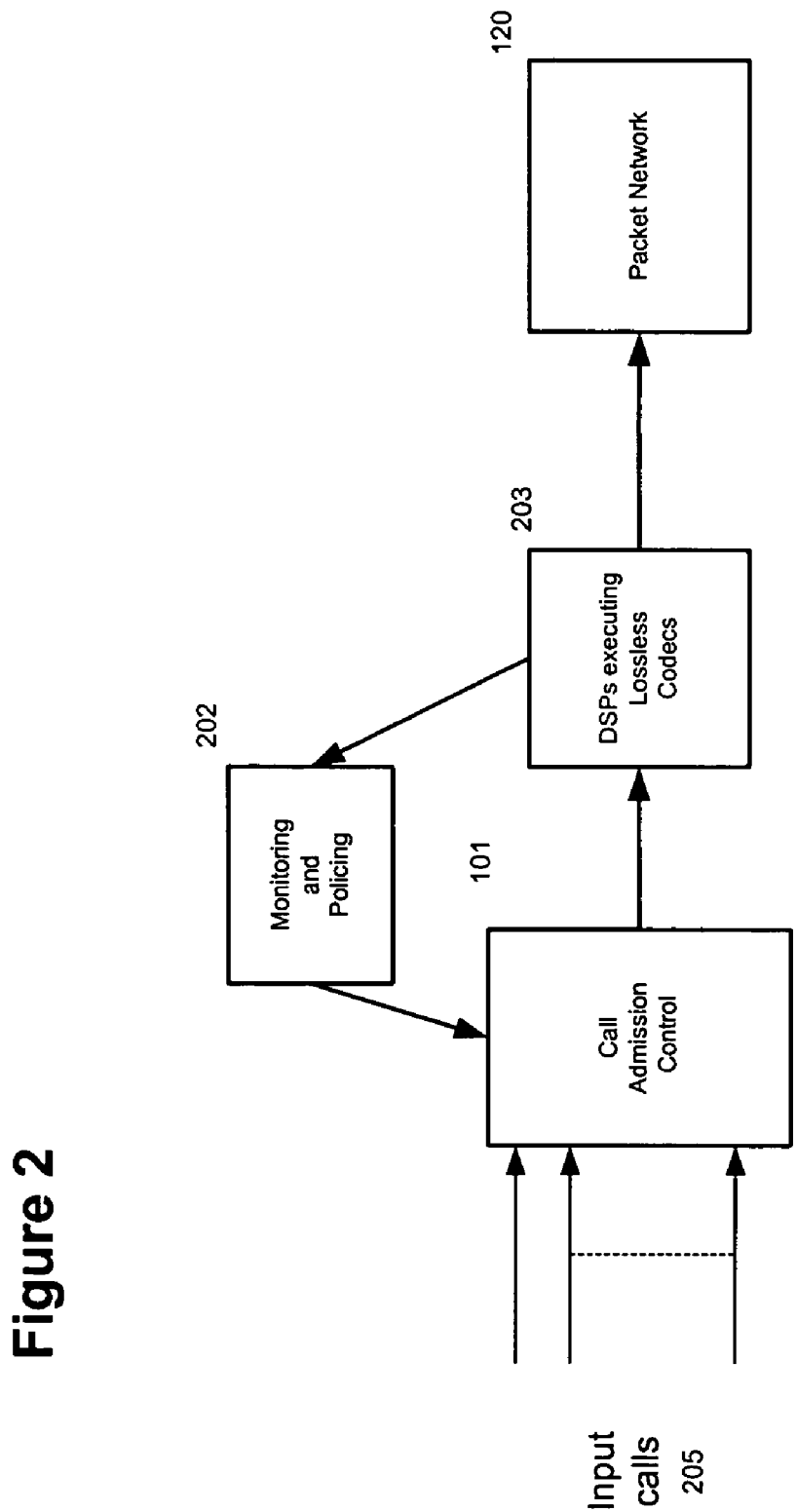
FIG. 2 is block diagram showing the feedback path to the Call Admission Control.

In the embodiment shown there is no pre-assignment of bandwidth to each of the channels. Instead, the actual bandwidth used is monitored. As shown in FIG. 2, there is a feedback path from the DSPs 203 that execute the loss-less codec 115, to the call access control 101. The actual bandwidth used is monitored and when bandwidth usage approaches the limit of available bandwidth, the number of calls admitted is decreased. The DSPs and the loss-less codecs are not shown and described in detail in that they are conventional. Obtaining data from the DSPs concerning bandwidth used is also conventional technology.

Figure 3:
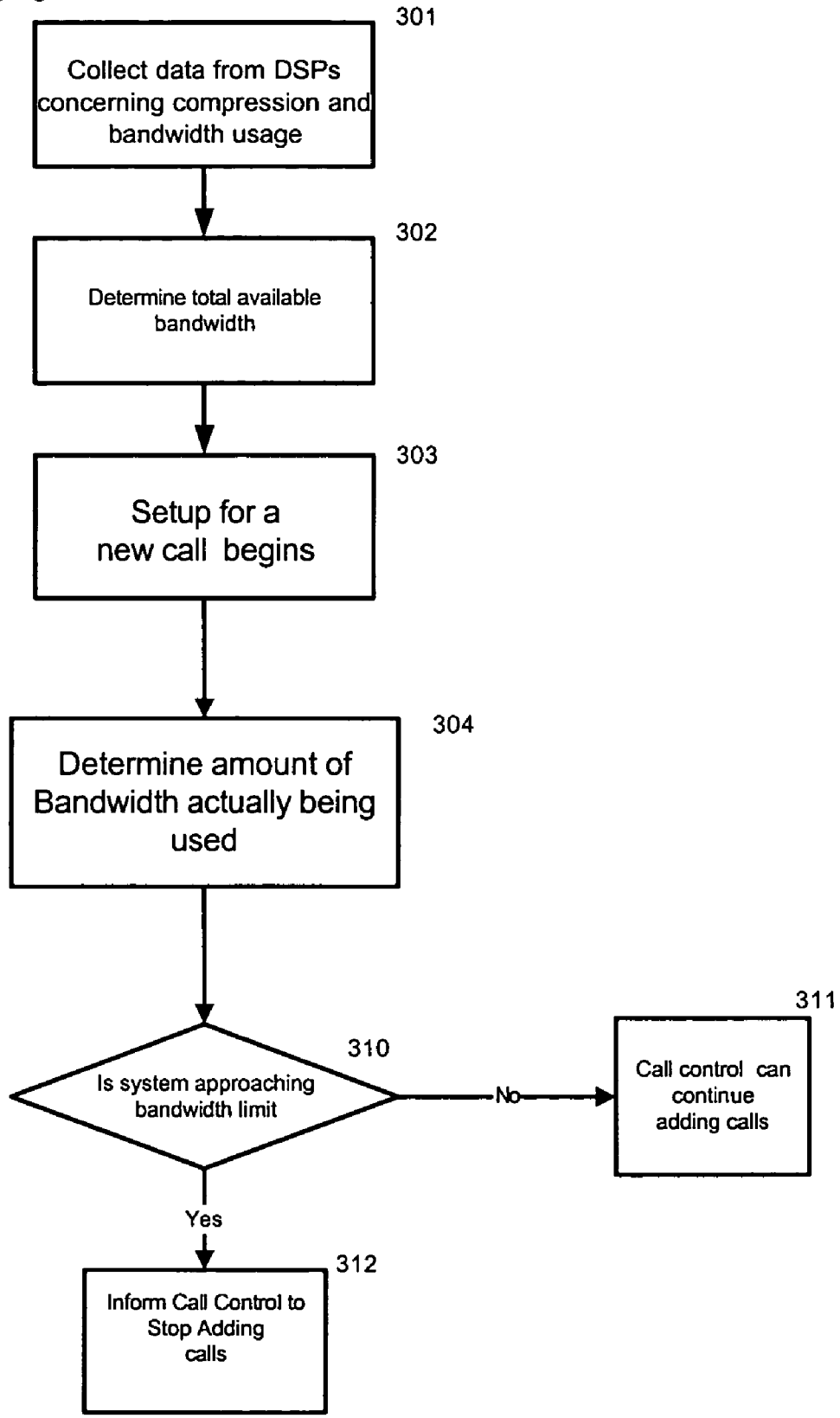
FIG. 3 is program flow diagram showing how the real time bandwidth allocation operates.

FIG. 3 is a block diagram showing the operation of the system. It should be understood that the monitoring and policing 202 and the feedback to the call admission control 101 are operations performed by computer programs. These programs would generally be in an operating system that controls the unit.

The system continually collects data from the DSPs that implement to loss-less codecs 115 as indicated by block 301. The data collected includes data which shows the amount of compression and the amount of bandwidth actually being used. The collected data is used to make a determination concerning the amount of bandwidth being used and the amount of bandwidth that is available at that particular time as indicated by block 302.

The rest of the operations shown in FIG. 3 occur at the time when a new call is being set up as indicated by block 303. As indicated by block 304, the total amount of bandwidth actually being used is calculated. If for example a particular channel (i.e. a particular DS0) is only carrying one call, it will be using less bandwidth than if it were carrying four calls. The bandwidth being used by all the DS0s on the transmission network is calculated.

A determination is then made concerning whether or not the system is approaching a pre-established bandwidth limit as indicated by block 303. If there is available bandwidth, the call admission control 105 is informed that it can continue admitting calls as indicated by block 304. As indicated by block 305, if the bandwidth usage has reached the pre-established limit, the call admission control is informed that no further calls should be admitted.

Thus, the number of call admitted by the call admission control is based upon the actual bandwidth usage situation in the system. There is not pre-assigned bandwidth for the various channels.

Figure 4:
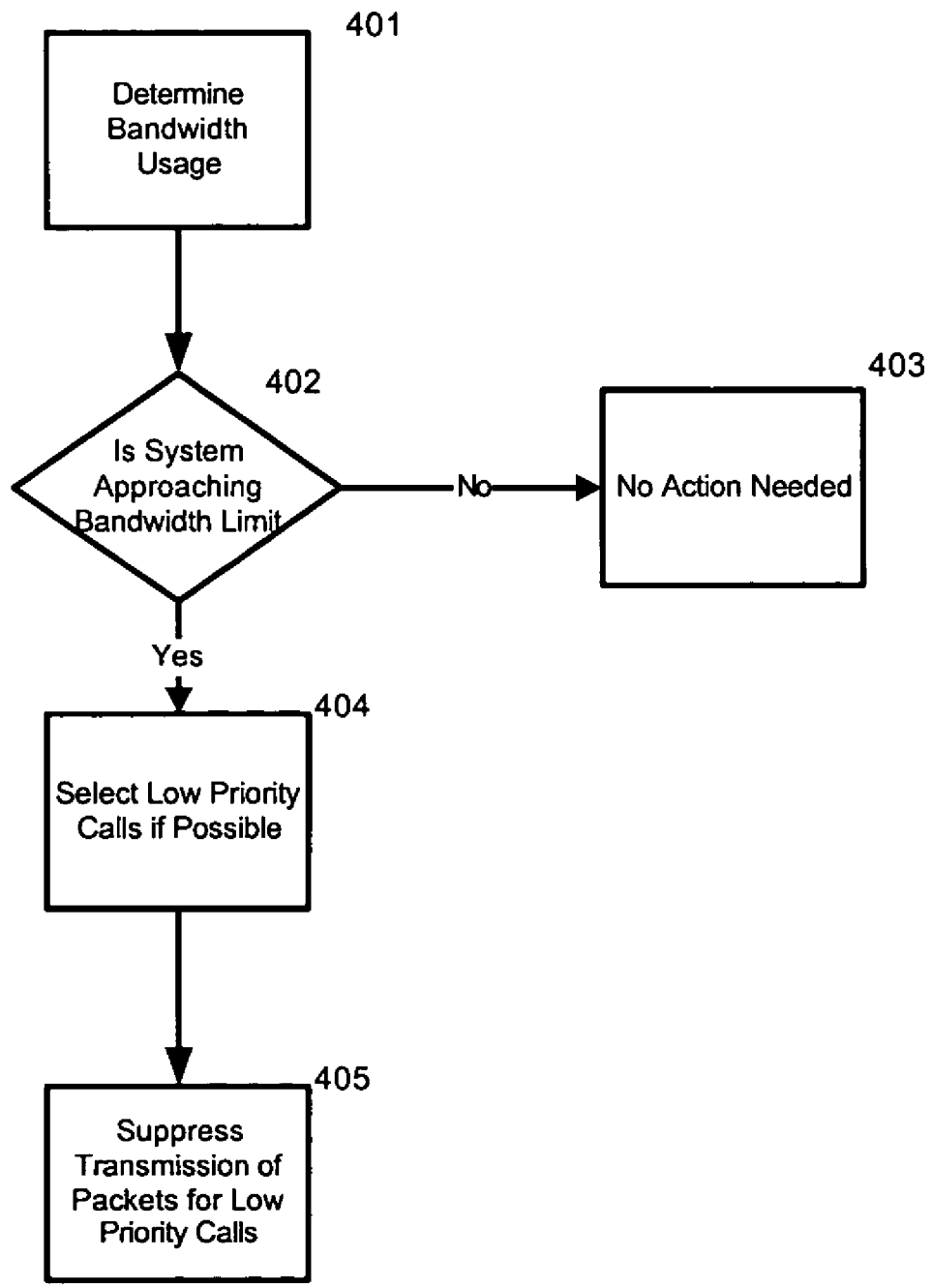
FIG. 4 is a program flow diagram showing the bandwidth policing operation.

The operation of the policing operation is shown in FIG. 4. First a determination is made concerning the bandwidth actually being used as indicated by block 401. A determination is made as indicated by block 402 as to whether or not the system is approaching its bandwidth limit. If it is not approaching the limit no action is needed. If the system is approaching the bandwidth limit, the low priority calls are selected as indicated by block 404. The bandwidth assigned to these calls is then reduced and transmission of packets related to these calls is suppressed. That is, the number of packets allowed for these calls is reduced to zero. As a result, the caller will hear no sound and eventually hang up. When a party hangs up, the call is terminated using the normal mechanism for call termination. The calculations indicated in FIG. 4 can be made as frequently as computer resources allow or for example each time a new call is admitted.

As indicated by the dotted block 110 in FIG. 1, the packet transmission network 120 may also be carrying other unrelated data. This may be low priority data, which is only transmitted over the network when the monitoring system 202 indicates that the network as unused network capacity. On the other hand, it may be high priority data which would in fact limit the amount of bandwidth available for the telephone calls. In such a case the total available bandwidth calculated in step 303 would be reduced as appropriate.

While the invention has been shown and described with respect to preferred embodiments thereof, it should be understood that various changes in form and detail may be made without departing from the spirit and scope of the invention. The scope of the invention is limited defined only by the appended claims.

We claim:

1. A system, comprising:
  a call admission control mechanism which controls the admission of calls for transmission over a packet communication link;
  loss-less codecs which compress and packetize calls for transmission over said communication link;
  a monitoring system for monitoring an observed amount of bandwidth being used on said communication link such that loss-less codes that are currently fully utilizing corresponding subchannels are identified;
  a feedback path from said monitoring system to said admission control mechanism whereby calls admitted for transmission over said link are limited when the amount of bandwidth being used on said link approaches a predetermined amount; and
  the call admission control mechanism assigning a new call to one of the non-identified loss-less codecs responsive to said monitoring when the amount of bandwidth being used on said link does not approach the predetermined amount.

2. The system recited in claim 1 wherein at least some of the calls being transmitted over said communication link are identified as lower priority calls, and where a policing mechanism restricts the number of packets transmitted for said lower priority calls when the bandwidth usage on said link reaches a predetermined amount.

3. The system recited in claim 1 wherein said communication link connects a Base Transceiver Station to a Base Station Controller.

4. The system recited in claim 3 wherein said Base Transceiver Station and said Base Station Controller operate using the Global System for Mobile Communication" (GSM) system protocol.

5. The system recited in claim 4 wherein each of said loss-less codecs is associated with one DS0 channel and handles four telephone calls.

6. The system of claim 1 wherein said monitoring means monitors the amount of bandwidth being used independently of any predicted bandwidth estimates that are produced before the existing calls are admitted, such that non-predicted, actual bandwidth usage is observed.

7. A method system, comprising:
compressing traffic for transmission over a communication link using a plurality of digital signal processors, said digital signal processors implementing one or more codecs that produce variable bit rate data streams;
monitoring an observed amount of bandwidth being used on said communication link such that ones of the digital signal processors approaching or at utilization capacity are identified, said observed amount of bandwidth associated with existing calls on the communication link;
admitting a new call for transmission over said communication link according to whether the amount of bandwidth being used on said communication link is below a predetermined amount; and
assigning the new call to one of the non-identified digital signal processors according to said monitoring.

8. The method recited in claim 7 wherein said communication link connects a Base Transceiver Station to a Base Station Controller.

9. The method system recited in claim 8 wherein said Base Transceiver Station and said Base Station Controller operate using the Global System for Mobile Communication" (GSM) system protocol.

10. The method system recited in claim 7 wherein each of said codecs is associated with one DS0 channel and handles four telephone calls.

11. A system, comprising:
means for compressing traffic for transmission over a communication link using a plurality of digital signal processors, said digital signal processors implementing one or more loss-less codecs;
means for monitoring an observed amount of bandwidth being used on said communication link such that ones of the digital signal processors approaching or at utilization capacity are identified, said observed amount of bandwidth associated with existing calls on the communication link;
means for admitting a new call for transmission over said communication link according to whether the amount of bandwidth being used on said communication link is below a predetermined amount; and
means for assigning the new call to one of the non-identified digital signal processors according to said observed bandwidth amount.

12. An apparatus, comprising:
one or more processors; and
a memory coupled to the one or more processors comprising instructions executable by the processors, the processors operable when executing the instructions to:
compress traffic for transmission over a communication link using a plurality of digital signal processors, said digital signal processors implementing one or more codecs that produce variable bit rate data streams;
monitor an observed amount of bandwidth being used on said communication link to identify ones of the digital signal processors approaching utilization capacity, said observed amount of bandwidth associated with existing calls on the communication link;
admit a new call for transmission over said communication link according to whether the amount of bandwidth being used on said communication link approaches a predetermined amount; and
assign the new call to one of the non-identified digital signal processors.

13. The apparatus of claim 12 wherein admission of the new call is based on feedback representing actual bandwidth usage that is independent of any bandwidth estimates generated before the existing calls were admitted on the communication link.

14. The apparatus of claim 13 wherein the processors are further operable to select ones of the existing calls for suppression according to priority prior to admitting the new call.

15. The apparatus of claim 13 wherein the processors are further operable to select one of the existing calls for suppression, said selection being independent of priority when the existing calls do not have different priority indications.

* * * * *

UNITED STATES PATENT AND TRADEMARK OFFICE
CERTIFICATE OF CORRECTION

PATENT NO. : 7,369,559 B2 Page 1 of 1
APPLICATION NO. : 10/680601
DATED : May 6, 2008
INVENTOR(S) : Garakani et al.

It is certified that error appears in the above-identified patent and that said Letters Patent is hereby corrected as shown below:

On the Title Page Item (75), please replace "Cisco Technology Inc." with --Cisco Technology, Inc.--.
At column 5, line 22, please replace "A method system," with --A method,--.
At column 5, line 42, please replace "The method system recited" with --the method recited--.
At column 5, line 46, please replace "The method system recited" with --the method recited--.

Signed and Sealed this

Second Day of June, 2009

JOHN DOLL
*Acting Director of the United States Patent and Trademark Office*